3,028,413
PROCESS FOR THE PRODUCTION OF ACETONITRILE

William L. Fierce, Crystal Lake, and Walter J. Sandner, Carpentersville, Ill., assignors to The Pure Oil Company, Chicago, Ill., a corporation of Ohio
No Drawing. Filed Mar. 22, 1957, Ser. No. 647,758
3 Claims. (Cl. 260—465.3)

This invention relates to new and useful improvements in methods for preparing acetonitrile and more particularly to a method in which methane is reacted with hydrogen cyanide to produce acetonitrile and hydrogen.

In our copending application, Serial No. 572,228, filed March 19, 1956, now Patent No. 2,802,020, there is described our process for preparing acetonitrile by heating a mixture of methane and cyanogen to a temperature sufficiently high to effect a reaction therebetween. When methane and cyanogen are reacted at elevated temperatures there are produced good yields of acetonitrile and hydrogen cyanide. While the aforementioned process has been very effective, it is subject to the disadvantage that it uses cyanogen as one of the starting reactants. Cyanogen is often obtained by the partial oxidation of hydrogen cyanide and is more expensive and more difficult to obtain than is hydrogen cyanide.

It is therefore one object of this invention to provide an improved method for preparing acetonitrile.

Another object of this invention is to provide a method of preparing acetonitrile using hydrogen cyanide as a starting reactant.

A feature of this invention is the provision of a process for preparing acetonitrile by the high temperature reaction of methane and hydrogen cyanide.

Other objects and features of this invention will become apparent from time to time throughout the specification and claims as hereinafter related.

This invention comprises a process in which a mixture of methane and hydrogen cyanide is reacted at a temperature of approximately 700 to 1050° C. Within this range of temperature hydrogen cyanide reacts rapidly with methane to produce acetonitrile and hydrogen as the principal reaction products. The reaction apparently proceeds as follows:

$$CH_4 + HCN \rightarrow CH_3CN + H_2$$

The hydrogen is formed in molar amounts which are approximately equal to the acetonitrile.

This reaction proceeds well at atmospheric pressure, although it may be carried out at either sub-atmospheric or super-atmospheric pressures. In carrying out this reaction the preferred mol ratio of methane to hydrogen cyanide is in the range from 1:2 to 6:1. The lower ratios of methane to hydrogen cyanide have been found to result in lower yields per pass through the reactor, but result in a higher proportion (higher selectivity) of acetonitrile produced per mol of hydrogen cyanide or methane consumed in the reaction. While the aforementioned range of proportion is somewhat preferred, the mol ratio of methane to hydrogen cyanide may vary widely as, for example, from 1:20 to 20:1. The reaction gases may be passed through the reaction zone at a gaseous hourly space velocity of approximately 50 to 2000, but a space velocity of 150 to 500 is preferred. In this process the term "space velocity" refers to the ratio of the volume of reactant gases at standard temperature and pressure charged per hour to the volume of the reaction space.

In carrying out this process the methane and hydrogen cyanide may be premixed and pre-heated, or may be separately charged to the reaction zone which is maintained at the desired reaction temperature. Any type of reaction zone which is resistant to attack by the reactants or reaction products may be used. Quartz, high-silica glass, stainless steel, or other refractory and corrosion-resistant materials may be used. The reaction zone may be heated by any suitable means, such as combustion gases applied externally to the reactor, or may be heated by external or internal electrical means, including resistance heaters and induction heaters, or by heating tubes extending through the reactor. Another method of heating which has been developed in recent years and which is particularly useful in this process is the use of hot refractory pebbles which are intermittently heated to the desired reaction temperature.

The product gases from the reaction zone consist of a mixture of hydrogen cyanide and methane which are unreacted, and the reaction products, acetonitrile and hydrogen together with small amounts of other by-products. These reaction gases are withdrawn from the reaction zone and cooled to a temperature sufficiently low to condense the acetonitrile. The liquid which is condensed from the reaction gases will ordinarily have to be fractionated to obtain pure acetonitrile free from liquid reaction by-products. Any unreacted methane and/or hydrogen cyanide may be recycled to the reaction zone in mixture with make-up quantities of methane and hydrogen cyanide so as to convert them to further quantities of acetonitrile.

This reaction proceeds readily in the absence of catalysts, but it is expected that suitable catalysts would accelerate the rate of reaction. In order to demonstrate the invention, a mixture of hydrogen cyanide and methane (C.P. Grade) was passed through an empty electrically heated Vycor tube having a length of 12", an outside diameter of ⅞", and a volumetric capacity of 92 cc. Vycor is a high-silica glass suitable for use at elevated temperatures. The methane and hydrogen cyanide were mixed prior to passing through the tube and were heated in the tube to a temperature of 856° C. The gases were mixed in a mol ratio of methane to hydrogen cyanide of 1.95 and were passed through the reaction zone at a gaseous hourly space velocity of 359. The mixture of reactant gases and reaction products was withdrawn from the reaction zone and analyzed by means of a mass spectrometer. In this experiment, 2.02% of the charged methane and 8.3% of the charged hydrogen cyanide were consumed. Of the hydrogen cyanide charged, 5.2% was converted to acetonitrile per pass through the reaction zone; 57.0% of the hydrogen cyanide consumed in the reaction zone was converted to acetonitrile. In this reaction, hydrogen was formed as a by-product in mol amounts (6.5%) approximately equal to those of the acetonitrile.

In another series of experiments three runs were made using different mol ratios of methane to hydrogen cyanide to determine the effect of mol ratio of reactants on the production of acetonitrile. These runs were carried out in the same apparatus used in the experiment reported above. The conditions of the runs and the results of each run are shown in Table I.

Table I

|  | Run #1 | Run #2 | Run #3 |
|---|---|---|---|
| Temperature (° C.) | 916 | 931 | 942 |
| Mol Ratio of CH₄/HCN | 1.84 | 0.55 | 5.77 |
| Gaseous hourly space velocity of charge gas | 392 | 249 | 298 |
| Percent HCN consumed | 14.2 | 11.0 | 28.7 |
| Percent CH₄ consumed | 6.7 | 16.3 | 7.3 |
| Acetonitrile—Yield per pass: | | | |
|   Based on HCN | 10.9 | 7.2 | 20.7 |
|   Based on CH₄ | 5.9 | 14.1 | 3.7 |
| Selectivity: | | | |
|   Based on HCN | 76.5 | 70.0 | 71.9 |
|   Based on CH₄ | 89.2 | 86.6 | 48.8 |

The yield per pass given in the table is the mols of acetonitrile produced expressed as a percentage of the mols of hydrogen cyanide or methane charged. The selectivity is the percentage of the hydrogen cyanide or the methane consumed which appears in the acetonitrile product. The temperature readings of the various runs are the actual readings of the thermocouples used to measure the reaction temperature. The normal error in temperature measurements in this range, however, is such that these runs should be considered as having been made at substantially constant temperature.

From an examination of this table it will be seen that variations in the mol ratio of methane to hydrogen cyanide do not have any substantial effect on the reaction. The selectivity based on hydrogen cyanide is approximately the same for each of the various runs. The selectivity based on methane charged is somewhat higher for lower ratios of methane to hydrogen cyanide. The yield per pass based on hydrogen cyanide charged tends to be somewhat higher for higher ratios of methane to hydrogen cyanide, but this increased yield is apparently accompanied by side reactions of the methane which result in a lower conversion of methane to acetonitrile.

Having thus completely and fully described the invention as required by the patent statutes it will be obvious to those skilled in the art that within the scope of the appended claims this invention may be practiced otherwise than as specifically described.

What is claimed is:

1. A method of preparing acetonitrile and hydrogen which comprises heating a mixture of methane and hydrogen cyanide to a temperature of about 850° to 950° C. in a reaction zone and cooling the reactant mixture to condense and recover the acetonitrile therefrom.

2. A method according to claim 1 in which the mol ratio of methane to hydrogen cyanide is from about 1:2 to 6:1.

3. A method according to claim 2 in which the hourly space velocity of reactants is about 150 to 500.

References Cited in the file of this patent

UNITED STATES PATENTS 2,449,643      Cosby      Sept. 21, 1948

OTHER REFERENCES

Thompson: Faraday Society, vol. 37 (1941), pages 349 to 350.